US009853707B2

United States Patent
Yu et al.

(10) Patent No.: US 9,853,707 B2
(45) Date of Patent: Dec. 26, 2017

(54) CHANNEL STATE INFORMATION COLLECTION FOR WIRELESS COMMUNICATION SYSTEM WITH BEAMFORMING

(71) Applicant: MEDIATEK INC., Hsinchu (TW)

(72) Inventors: Chia-Hao Yu, Yilan County (TW);
Ming-Po Chang, New Taipei (TW);
Ju-ya Chen, Kaohsiung (TW);
Jiann-Ching Guey, Hsinchu (TW)

(73) Assignee: MEDIATEK INC, Hsin-Chu (TW)

( * ) Notice: Subject to any disclaimer, the term of this patent is extended or adjusted under 35 U.S.C. 154(b) by 0 days.

(21) Appl. No.: 14/854,344

(22) Filed: Sep. 15, 2015

(65) Prior Publication Data

US 2016/0080060 A1 Mar. 17, 2016

Related U.S. Application Data

(60) Provisional application No. 62/050,840, filed on Sep. 16, 2014.

(51) Int. Cl.
*H04W 72/00* (2009.01)
*H04B 7/06* (2006.01)
(Continued)

(52) U.S. Cl.
CPC ......... *H04B 7/0626* (2013.01); *H04B 7/0408* (2013.01); *H04B 7/0695* (2013.01);
(Continued)

(58) Field of Classification Search
CPC .. H04B 7/0626; H04B 7/0408; H04B 7/0695; H04B 7/0452; H04L 5/0053
See application file for complete search history.

(56) References Cited

U.S. PATENT DOCUMENTS

2008/0008110 A1* 1/2008 Kishigami ............ H04W 16/28
370/310
2012/0093136 A1 4/2012 Julian et al. .................. 370/336
(Continued)

FOREIGN PATENT DOCUMENTS

CN 101877608 A 11/2010
CN 103220076 A 7/2013
(Continued)

OTHER PUBLICATIONS

International Search Report and Written Opinion of International Search Authority for PCT/CN2015/089706 dated Dec. 21, 2015 (11 pages).

(Continued)

*Primary Examiner* — Keith Fang
(74) *Attorney, Agent, or Firm* — Imperium Patent Works; Zheng Jin; Darien Wallace

(57) ABSTRACT

A method of providing channel station information in a beamforming system is proposed. Reference Signal (RS) is used for channel state estimation. For fine-resolution dedicated beam with smaller spatial coverage, additional channel monitoring of coarse-resolution beams for beam fallback is applied. The joint coverage of monitored fallback beams covers a desired service area. For beam administration, fallback beams need to be evaluated and the most preferable beam is selected for use in case the currently used dedicated beam is no longer suitable. For link adaptation, at least the channel state of the selected fallback beam is evaluated and provided to a scheduler (e.g., a BS) for adapting the transmission of the selected fallback beam.

16 Claims, 8 Drawing Sheets

(51) Int. Cl.
   *H04B 7/0408*   (2017.01)
   *H04L 5/00*     (2006.01)
   *H04B 7/0452*   (2017.01)

(52) U.S. Cl.
   CPC .......... *H04B 7/0452* (2013.01); *H04L 5/0023* (2013.01); *H04L 5/0051* (2013.01); *H04L 5/0053* (2013.01)

(56) References Cited

U.S. PATENT DOCUMENTS

| | | | |
|---|---|---|---|
| 2012/0213137 A1 | 8/2012 | Jeong et al. | 370/311 |
| 2013/0235807 A1 | 9/2013 | Lee et al. | 370/329 |
| 2013/0295852 A1 | 11/2013 | Kim et al. | 455/63.4 |
| 2014/0211731 A1* | 7/2014 | Inoue | H04B 7/0456 370/329 |
| 2015/0092676 A1* | 4/2015 | Periyalwar | H04W 76/025 370/329 |
| 2016/0192433 A1 | 6/2016 | Deenoo et al. | 370/329 |
| 2017/0034812 A1 | 2/2017 | Deng et al. | 370/329 |

FOREIGN PATENT DOCUMENTS

| | | |
|---|---|---|
| EP | 2747304 A1 | 6/2014 |
| WO | WO2013134128 A1 | 9/2013 |

OTHER PUBLICATIONS

International Search Report and Written Opinion of International Search Authority for PCT/CN2015/090773 dated Dec. 31, 2015 (11 pages).

USPTO, Office Action for related U.S. Appl. No. 14/859,668 dated Apr. 7, 2017 (9 pages).

USPTO, Office Action for related U.S. Appl. No. 14/859,668 dated Aug. 25, 2017 (11 pages).

\* cited by examiner

DL-RS-BASED CSI ACQUISITION AND FEEDBACK

PREFERRED EMBODIMENT

PREFERRED EMBODIMENT

CHANNEL STATE INFORMATION COLLECTION FOR WIRELESS COMMUNICATION SYSTEM WITH BEAMFORMING

CROSS REFERENCE TO RELATED APPLICATIONS

This application claims priority under 35 U.S.C. §119 from U.S. Provisional Application No. 62/050,840, entitled "Channel State Information Collection for Wireless Communication System with Beamforming," filed on Sep. 16, 2014; the subject matter of which is incorporated herein by reference.

TECHNICAL FIELD

The disclosed embodiments relate generally to wireless communication, and, more particularly, to channel state information (CSI) collection in a Millimeter Wave (mmW) beamforming system.

BACKGROUND

The bandwidth shortage increasingly experienced by mobile carriers has motivated the exploration of the underutilized Millimeter Wave (mmWave) frequency spectrum between 3 G and 300 G Hz for the next generation broadband cellular communication networks. The available spectrum of mmWave band is two hundred times greater than the conventional cellular system. The mmWave wireless network uses directional communications with narrow beams and can support multi-gigabit data rate. The underutilized bandwidth of the mmWave spectrum has wavelengths ranging from 1 mm to 100 mm. The very small wavelengths of the mmWave spectrum enable large number of miniaturized antennas to be placed in a small area. Such miniaturized antenna system can produce high beamforming gains through electrically steerable arrays generating directional transmissions.

With recent advances in mmWave semiconductor circuitry, mmWave wireless system has become a promising solution for real implementation. However, the heavy reliance on directional transmissions and the vulnerability of the propagation environment present particular challenges for the mmWave network. In general, a cellular network system is designed to achieve the following goals: 1) Serve many users with widely dynamical operation conditions simultaneously; 2) Robust to the dynamics in channel variation, traffic loading and different QoS requirement; and 3) Efficient utilization of resources such as bandwidth and power. Beamforming adds to the difficulty in achieving these goals.

Analog beamforming is a good candidate for application in mmWave beamforming wireless systems. It provides array gain for compensating severe pathloss due to harsh wireless propagation environment, and removes the need for training channel response matrix between multiple antenna elements at TX/RX sides. Different beamformers can have different spatial resolution. For example, a sector antenna can have shorter by wider spatial coverage, while a beamforming antenna can have longer by narrower spatial coverage. To provide moderate array gain, large number of array elements may be needed.

Link adaptation is essential for efficient transmission in mmWave beamforming wireless systems. For proper link adaptation operation, relevant channel state information (CSI) should be collected and provided to the scheduler (e.g., the base station). The collection and provisioning of relevant channel state information, however, face several issues. First, channel reciprocity may be used in TDD systems. Second, different beamformers observe different channel states. Therefore, observations corresponding to a beamformer cannot be applicable to other beamformers. Third, the transmission path lifetime could be short. In mmWave systems, transmission path lifetime is expected one order of magnitude shorter than traditional cellular bands due to wavelength difference. Combined with dedicated beam with small spatial coverage, the number of effective transmission paths for a dedicated beam could be rather limited, thus more vulnerable to UE movements and environmental changes.

A solution for channel state information collection in mmWave beamforming systems is sought.

SUMMARY

A method of providing channel state information in a beamforming system is proposed. A Reference Signal (RS) is used for channel state estimation. For fine-resolution dedicated beams with smaller spatial coverage, additional channel monitoring of coarse-resolution beams for beam fallback is applied. The joint coverage of monitored fallback beams covers a desired service area. For beam administration, fallback beams need to be evaluated, and the most preferable beam is selected for use in case the currently used dedicated beam is no longer suitable. For link adaptation, at least the channel state of the selected fallback beam is evaluated and provided to a scheduler (e.g., a base station BS) for adapting the transmission of the selected fallback beam.

In one embodiment, a UE establishes a data connection with a base station over a dedicated beam in a beamforming network. The dedicated beam has a fine resolution with smaller spatial coverage. The UE monitors a set of fallback beams. Each fallback beam has a coarse resolution with larger spatial coverage. The UE receives DL-RS periodically transmitted over each of the fallback beams. The UE estimates CSI for each fallback beam. The UE transmits CSI feedback information to the base station. In one example, the fallback beams are control beams, and a collection of the control beams covers an entire service area of a cell.

In another embodiment, a base station establishes a data connection with a UE over a dedicated beam in a beamforming network. The dedicated beam has a fine resolution with a smaller spatial coverage. The base station monitors a set of fallback beams. Each fallback beam has a coarse resolution with a larger spatial coverage. The base station receives periodically transmitted UL SRS over each of the fallback beams. The base station estimates the CSI for each fallback beam. The base station determines a selected fallback beam based on the CSI via a beam administration procedure. In one example, the fallback beams are control beams, and a collection of the control beams covers an entire service area of a cell.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
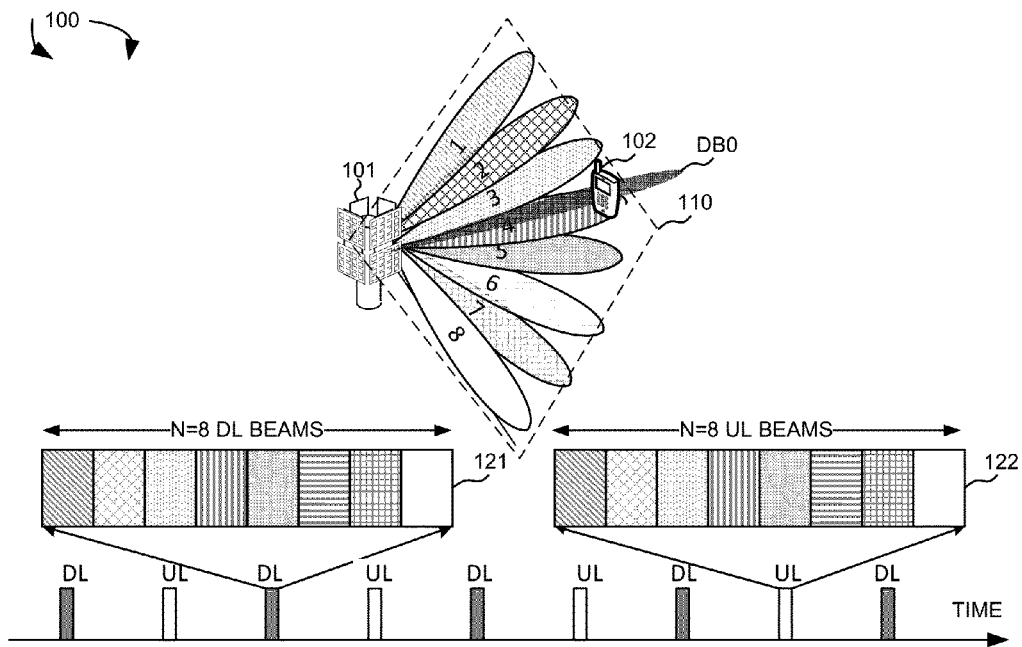
FIG. 1 illustrates control beams and dedicated beams in a beamforming wireless communication system in accordance with one novel aspect.

FIG. 1 illustrates control beams in a beamforming Millimeter Wave (mmWave) cellular network 100 in accordance with one novel aspect. Beamforming network 100 comprises a base station BS 101 and a user equipment UE 102. The mmWave cellular network uses directional communications with narrow beams and can support multi-gigabit data rate. Directional communications are achieved via digital and/or analog beamforming, wherein multiple antenna elements are applied with multiple sets of beamforming weights to form multiple beams. For control purpose, a set of coarse TX/RX control beams are provisioned by the base station in the cellular system. The set of control beams may be periodically configured or occur indefinitely and repeatedly in order known to the UEs. The set of control beams covers the entire cell coverage area with moderate beamforming gain. Each control beam broadcasts a minimum amount of beam-specific information similar to Master Information Block or System Information Block (MIB or SIB) in LTE. Each beam may also carry UE-specific control or data traffic. Each beam transmits a set of known signals for the purpose of initial time-frequency synchronization, identification of the control beam that transmits the signals, and measurement of radio channel quality for the beam that transmits the signals.

In the example of FIG. 1, BS 101 is directionally configured with multiple cells, and each cell is covered by a set of coarse TX/RX control beams. In one embodiment, cell 110 is covered by eight control beams CB0 to CB7. Each control beam comprises a set of downlink resource blocks, a set of uplink resource blocks, and a set of associated beamforming weights with moderate beamforming gain. In the example of FIG. 1, different control beams are time division multiplexed (TDM) in time domain. A downlink subframe 121 has eight DL control beams. An uplink subframe 122 has eight UL control beams. The set of control beams are lower-level control beams that provide low rate control signaling to facilitate high rate data communication on higher-level data beams. For example, UE 102 performs synchronization with BS 101 via control beam CB4, and exchanges data traffic with BS 101 via dedicated data beam DB0. The control beam and data beam architecture provides a robust control-signaling scheme to facilitate the beamforming operation in mmWave cellular network systems. Different levels of dedicated beams with different resolutions can be defined and trained for data communication.

Link adaptation is essential for efficient transmission in mmWave beamforming wireless systems. For proper link adaptation operation, relevant channel state information (CSI) should be collected and provided to the scheduler (e.g., BS 101). In accordance with one novel aspect, Reference Signal (RS) is used for channel state estimation. Non-RS-based link adaptation is not used because it usually utilizes successful/failed packet transmission as guidance. As a result, the non-RS-based link adaptation shows smaller convergence speed to channel state RS transmitted in only one direction (either UL or DL) can be utilized in Time Division Duplex (TDD) systems based on TDD channel reciprocity nature.

Furthermore, for fine-resolution dedicated beam with smaller spatial coverage, additional channel monitoring of coarse resolution beams for beam fallback is applied. The joint coverage of monitored fallback beams should cover a desired service area, e.g., a cell/sector. For beam administration, e.g., proper beam is selected for communication, fallback beams need to be evaluated and the most preferable beam is selected for use in case a currently used dedicated beam is no longer suitable. For link adaptation, at least the channel state of the selected fallback beam needs to be evaluated and be provided to a scheduler (e.g., the BS) as well for adapting the transmission of the fallback beam.

Figure 2:
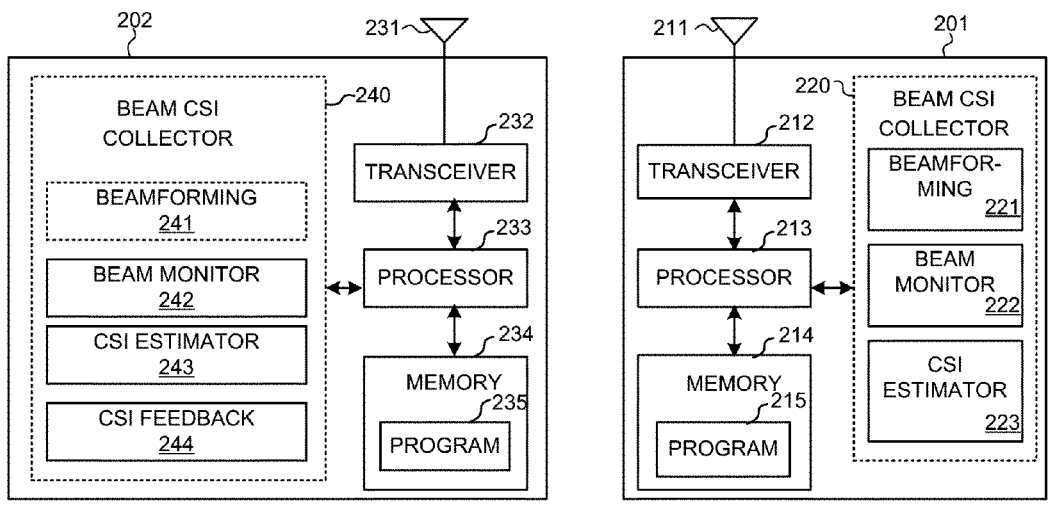
FIG. 2 is a simplified block diagram of a base station and a user equipment that carry out certain embodiments of the present invention.

FIG. 2 is a simplified block diagram of a base station and a user equipment that carry out certain embodiments of the present invention. BS 201 has an antenna array 211 having multiple antenna elements that transmits and receives radio signals, one or more RF transceiver modules 212, coupled with the antenna array, receives RF signals from antenna 211, converts them to baseband signal, and sends them to processor 213. RF transceiver 212 also converts received baseband signals from processor 213, converts them to RF signals, and sends out to antenna 211. Processor 213 processes the received baseband signals and invokes different functional modules to perform features in BS 201. Memory 214 stores program instructions and data 215 to control the operations of BS 201. BS 201 also includes multiple function modules that carry out different tasks in accordance with embodiments of the current invention.

Similarly, UE 202 has an antenna 231, which transmits and receives radio signals. A RF transceiver module 232, coupled with the antenna, receives RF signals from antenna 231, converts them to baseband signals and sends them to processor 233. RF transceiver 232 also converts received baseband signals from processor 233, converts them to RF signals, and sends out to antenna 231. Processor 233 processes the received baseband signals and invokes different functional modules to perform features in UE 202. Memory 234 stores program instructions and data 235 to control the operations of UE 202. UE 202 also includes multiple function modules and circuits that carry out different tasks in accordance with embodiments of the current invention.

The functional modules are circuits that can be implemented and configured by hardware, firmware, software, and any combination thereof. For example, BS 201 comprises a beam CSI collector 220, which further comprises a beamforming circuit 221, a beam monitor 222, and a beam CSI estimator 223. Beamforming circuit 221 may belong to part of the RF chain, which applies various beamforming weights to multiple antenna elements of antenna 211 and thereby forming various beams. Beam monitor 222 monitors received radio signals and performs measurements of the radio signals over the various beams. CSI estimator 223 estimates the channel states based on the beam monitoring results for each beam.

Similarly, UE 202 comprises a beam CSI collector 240, which further comprises a beamforming circuit 241, a beam monitor 242, and a beam CSI estimator 243, and a CSI feedback circuit 244. Beamforming circuit 241 may belong to part of the RF chain, which applies various beamforming weights to multiple antenna elements of antenna 211 and thereby forming various beams. Beamforming circuit 241 is optional for UE side, because UE 202 can use omni beam instead. Beam monitor 242 monitors received radio signals and performs measurements of the radio signals over the various beams. CSI estimator 243 estimates the channel states based on the beam monitoring results for each beam. CSI feedback circuit 244 selects a subset of the estimated CSIs and then provide feedback to BS 201 for fallback beam evaluation.

Figure 3:
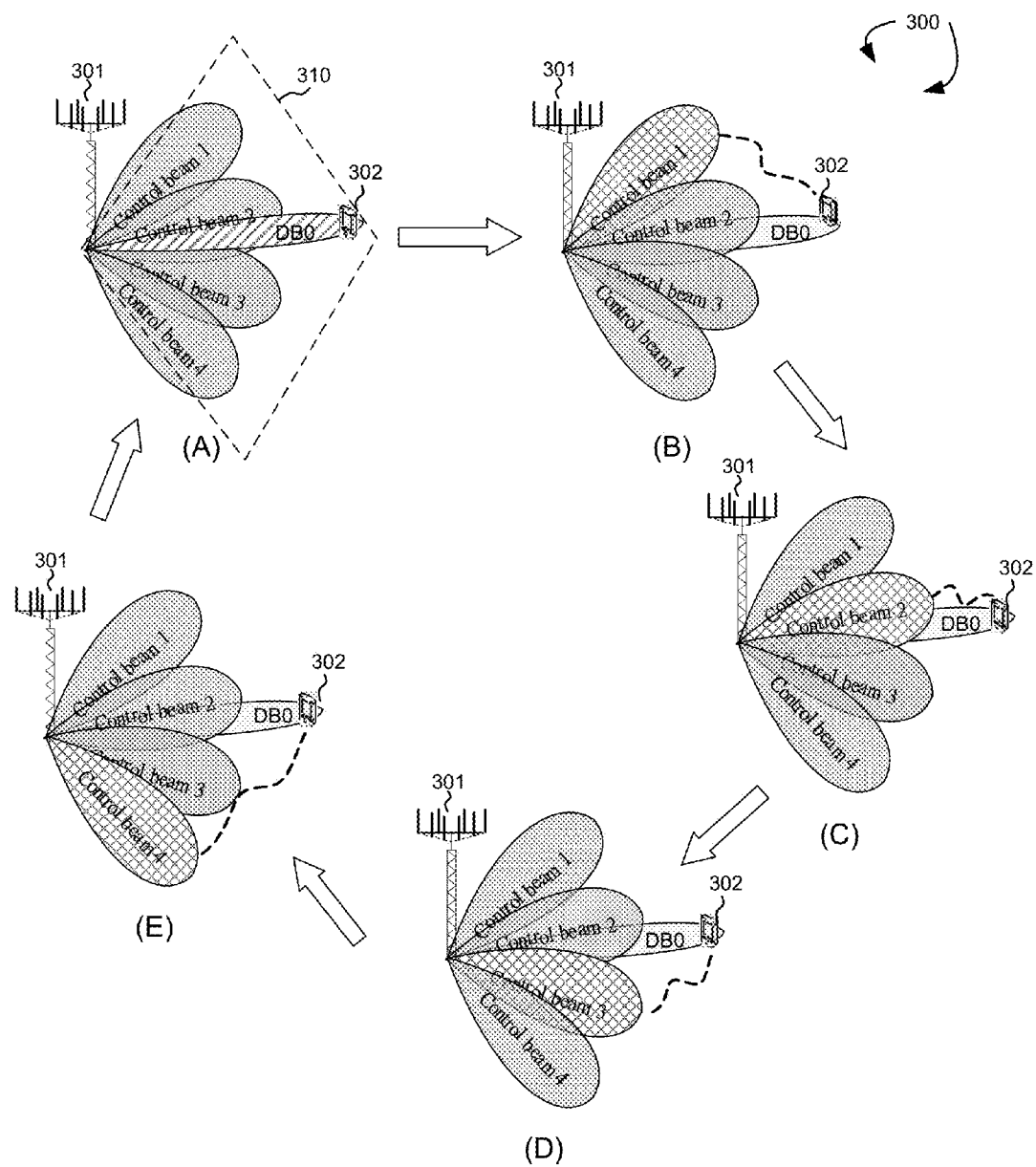
FIG. 3 illustrates additional channel monitoring for fallback need in a beamforming system.

FIG. 3 illustrates additional channel monitoring for fallback need in a beamforming system. Beamforming network 300 comprises a base station BS 301 and a user equipment UE 302. BS 301 is directionally configured with multiple cells, and each cell is covered by a set of coarse TX/RX control beams. In one embodiment, cell 310 is covered by four control beams CB1 to CB4. Initially, UE 302 performs scanning, beam selection, and synchronization with BS 301 using the control beams. Later, a dedicated beam DB0 is trained and then used for data communication between BS 301 and UE 302, as depicted by diagram (A). In mmWave systems, transmission path lifetime is expected one order of magnitude shorter than traditional cellular bands due to wavelength difference. Combined with dedicated beam with small spatial coverage, the number of effective transmission paths for a dedicated beam could be rather limited, thus more vulnerable to UE movements and environmental changes. Different spatial paths offered by different levels of beams result in different channel coherent time and fading dynamics. Multiple choices of spatial beams thus offer more spatial diversity to be explored in mmWave cells.

Therefore, for fine-resolution dedicated beam with smaller spatial coverage, additional channel monitoring of coarser resolution beams is applied for beam fallback purpose. If different control beams are time division multiplexed (TDM) in time domain, then the control beams are monitored in different time slots/OFDM symbols. As depicted by diagram (B), BS 301 or UE 302 monitors control beam CB1 while maintaining data connection via dedicated beam DB0 at a first time slot. As depicted by diagram (C), BS 301 or UE 302 monitors control beam CB2 while maintaining data connection via dedicated beam DB0 at a second time slot. As depicted by diagram (D), BS 301 or UE 302 monitors control beam CB3 while maintaining data connection via dedicated beam DB0 at a third time slot.

As depicted by diagram (E), BS 301 or UE 302 monitors control beam CB4 while maintaining data connection via dedicated beam DB0 at a fourth time slot. The control beam monitoring is configured to occur periodically, and the preferred control beam is determined in beam administration procedure. If the channel quality associated with the dedicated beam DB0 is below a threshold, then BS 301 will switch to the preferred control beam as the fallback beam and continue data transmission.

Different reference signals (RS) can be used for beam monitoring and channel state estimation. In general, several options of using downlink reference signal DL RS and/or uplink sounding reference signal UL SRS are available. First, purely using DL RS transmitted by BS for dedicated beam and fallback beams monitoring. This requires an UL feedback channel for feeding back UE-estimated channel state information and channel reciprocity. Second, purely using UL SRS transmitted by UE for dedicated beam and fallback beams monitoring. This does not require UL feedback channel but still requires channel reciprocity. Third, both DL RS and UL SRS transmission are used for link monitoring. DL channel states are monitored at UE by using BS DL RS transmission, and fed back to BS. UL channel states are monitored at BS by using UE UL SRS transmission. This does not require channel reciprocity. Fourth, hybrid approach based on DL RS and UL SRS is used. A subset of to-be-monitored beams are monitored at BS by using UE UL SRS transmission. The remaining to-be-monitored beams are monitored at UE by using BS DL RS transmission. For example, channel state of dedicated beam is monitored at BS by using UE UL SRS transmission. Channel state of fallback beams are monitored at UE by using BS DL RS transmission, and fed back to BS via an UL feedback channel. This requires channel reciprocity.

Note that the channel state for each beamformed channel is estimated without estimating the entire channel response matrix H. The reference signal carried on different beams are precoded for estimating CQI. For UE to monitor multiple beams, it estimates CQI corresponding to different beams individually. When providing CQI feedback, UE may need to include additional index to notify which CQI corresponds to which beam.

Figure 4:
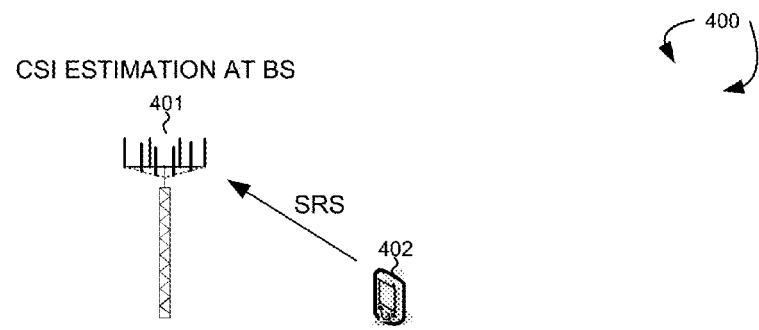
FIG. 4 illustrates a first embodiment of UL SRS for base station CSI acquisition.

FIG. 4 illustrates a first embodiment of using UL SRS for base station CSI acquisition in a beamforming system. Beamforming network 400 comprises a BS 401 and a UE 402. BS 401 is directionally configured with multiple cells, and each cell is covered by a set of coarse TX/RX control beams. BS 401 and UE 402 also communicate with each other via one or more trained dedicated beams. In the embodiment of FIG. 4, UE 402 transmits UE-specific UL wideband SRS to BS 401 for CSI acquisition. RS on UL data channel can also be used for channel state estimation, though more opportunistically and narrowband. If narrow band SRS transmission is used, then multiple transmissions are required to fully cover the desired bandwidth. For fallback possibility, multiple fallback beam channels (e.g., control beam channels) and dedicated beam channels are monitored. This is because the channel characteristics for different beamformers between BS 401 and UE 402 are different. Each individual UE UL SRS transmissions are used for estimating channel states corresponding to individual beams to be monitored. This requires additional complexity in UL scheduling for SRS transmission on the to-be-monitored channels. In certain cases, the UE beam used for UL SRS transmission is signaled to the UE by BS. If BS 401 is equipped with multiple RF transceiver chains, then single UE UL SRS transmission can be used for estimating channel states of multiple beams.

Figure 5:
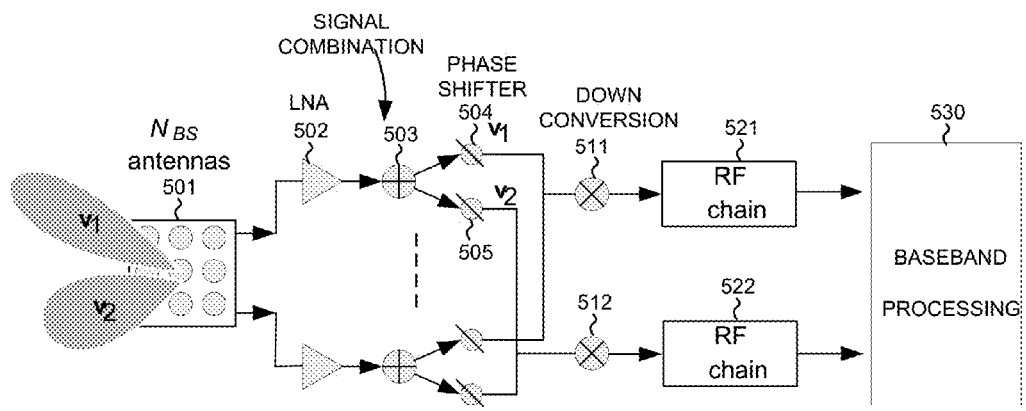
FIG. 5 illustrates estimating channel states of multiple beams using multiple RF chains.

FIG. 5 illustrates simultaneously estimating channel states of multiple beams using multiple RF chains. Through directional antenna technology, complex beamforming weights are adjusted and then applied to the signals received by the multiple antenna elements to focus the receiving radiation power to the desire direction. The beamforming weights can be applied in analog domain in the RF chain or applied in digital domain at the baseband. Multiple sets of complex weights can be applied to the multiple antenna elements, forming one beam at a time or multiple beams simultaneously. In the example of FIG. 5, analog beamforming is applied using two RF chains 521 and 522, where two sets of complex beamforming weights (e.g., beamforming phase shifter vectors v1 and v2) are applied to the multiple antenna elements $N_{BS}$ 501, forming two beams simultaneously. As a result, a single UL SRS transmission can be used for estimating channel states of two beams simultaneously.

Figure 6:
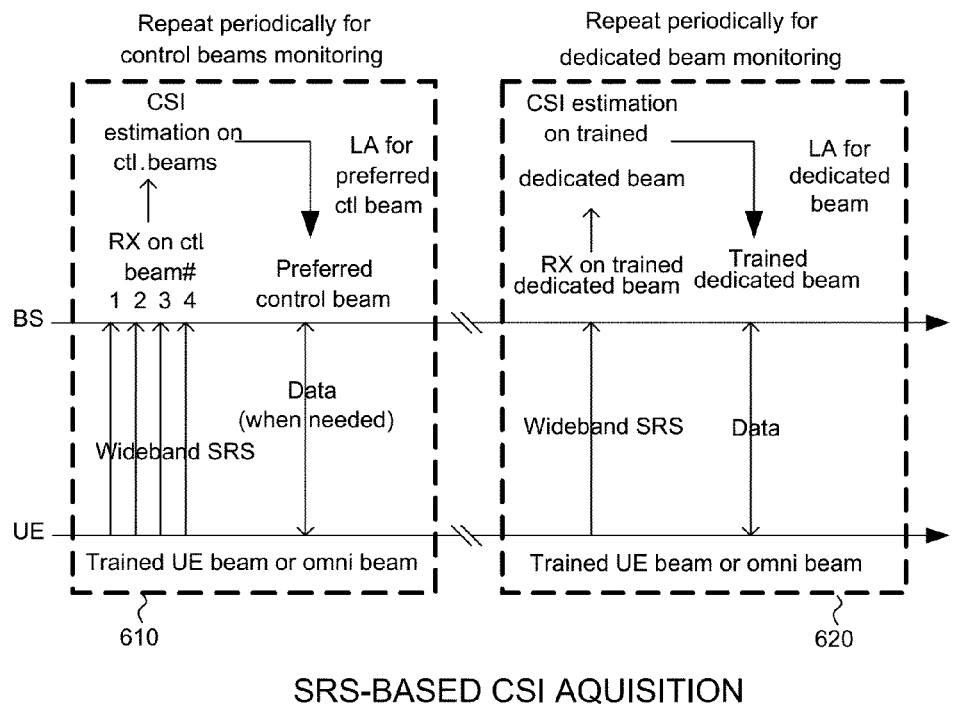
FIG. 6 illustrates signal flow of the first embodiment of SRS-based CSI collection.

FIG. 6 illustrates signal flow of the first embodiment of UL SRS-based CSI collection between a UE and a BS. Box 610 depicts the periodically repeated control beam monitoring. The UE transmits trained UE beam or omni beam using wideband SRS. The BS receives the SRS via control beams #1, #2, #3, and #4, either one at a time, or multiple beams simultaneously if equipped with multiple RF chains. The BS then performs CSI estimation for each control beam. Based on the estimated channel states, the BS can select a preferred control beam as the fallback beam. Whenever needed, the preferred control beam can also be used for data communication.

Box 620 depicts the periodically repeated dedicated beam monitoring. The UE transmits trained UE beam or omni beam using wideband SRS. The BS receives the SRS via trained dedicated beam. The BS then performs CSI estimation on the trained dedicated beam. The trained dedicated beam is used for data transmission. If the trained dedicated beam is no longer suitable, then the preferred control beam will be used as a fallback beam to continue data transmission. Note that the trained dedicated beam may be adapting based on a beam administration process for determining a proper dedicated beam. Only when the beam administration process fails to provide a proper dedicated beam, and when a fallback criterion is met, then the fallback beam is used for continuing the data transmission.

Figure 7:
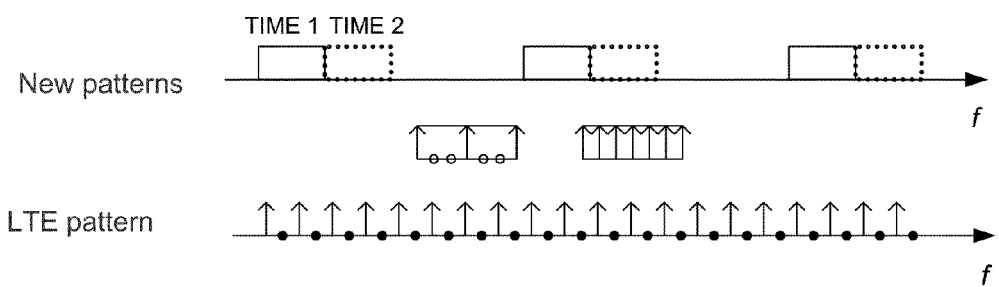
FIG. 7 illustrates an example of UL SRS pattern for BS CSI acquisition.

FIG. 7 illustrates an example of UL SRS pattern for BS CSI acquisition in a beamforming system. There are behavioral changes in beamforming systems compared to traditional cellular systems (e.g., LTE). UE-side beamformer for transmitting SRS can be signaled from BS. For example, when UE-side beamformer is applied and is controlled by BS. In such case, SRS transmission can be subject to different UE beamformers. SRS pattern can be sparser, not necessarily comb-type, as beamformed channel is less frequency-selective. As illustrated in FIG. 7, the SRS pattern in LTE is comb-type, while the new SRS pattern in the beamforming system follows a time hopping as depicted in dotted squares. As illustrated, in time 1, SRS is transmitted in solid square regions. In time 2, SRS is transmitted in dotted squares. This is also beneficial for UL link budget point of view, since more power can be put on SRS when it is sparser. Within a solid/dotted square of SRS as illustrated in the figure, its pattern can vary as well, dependent on how dispersive the channel is.

The periodicity for control beam monitoring and dedicated beam monitoring is not necessary the same. The preferred control beam and trained dedicated beam are determined in beam administration procedure. The advantage of using UL SRS for BS CSI acquisition is that channel states are directly estimated at BS, thus no need for CSI quantization for feedback. Better beamformer estimation by BS is possible to achieve optimized beamformer. This is because BS is required to be equipped with multiple transceiver chains for better beamformer estimation, and the estimated beamformer may not be constrained by a codebook known to UE. This is especially true in DL MU-MIMO scenario, which is a sensible high-rank transmission method in mmWave system. Furthermore, the same UL SRS can also be used by the UE for UL power control and timing advance if needed.

Figure 8:
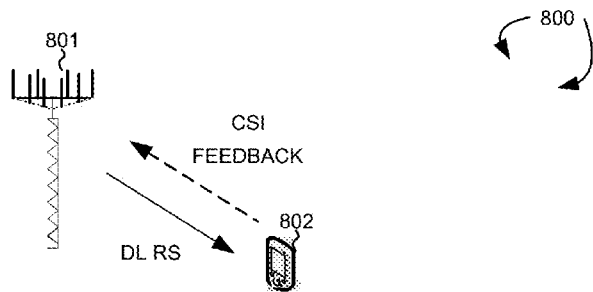
FIG. 8 illustrates a second embodiment of DL RS for UE CSI acquisition and feedback.

FIG. 8 illustrates a second embodiment of DL RS for CSI acquisition and feedback in a beamforming system. Beamforming network 800 comprises a BS 801 and a UE 802. BS 801 is directionally configured with multiple cells, and each cell is covered by a set of coarse TX/RX control beams. BS 801 and UE 802 also communicate with each other via one or more trained dedicated beams. In the embodiment of FIG. 8, BS 801 transmits DL RS to UE 802 for CSI estimation and reporting. RS in DL data channel can also be used for CSI estimation, though more opportunistically. For fallback possibility, multiple fallback beam channels (e.g., control beam channels) and dedicated beam channels are monitored. This is because the channel characteristics for different beamformers between BS 801 and UE 802 are different. Each individual DL RS transmissions are required for estimating channel states corresponding to individual beams to be monitored. However, the same DL RS transmission can be used by different UE for CSI estimation. CSI for individual channels can be aggregated and fed back to BS in the same UL transmission periodically. The CSI feedback can be sent on either dedicated beam, or an associated beam or both. An associated beam is the control beam that has overlapped beam coverage with the dedicated beam. For DL CSI of fallback beams, it is preferred that a subset of fallback beams' CSI is fed back. For example, the channels with best quality, or the channels whose quality is at least comparable to the associated control beam.

Figure 9:
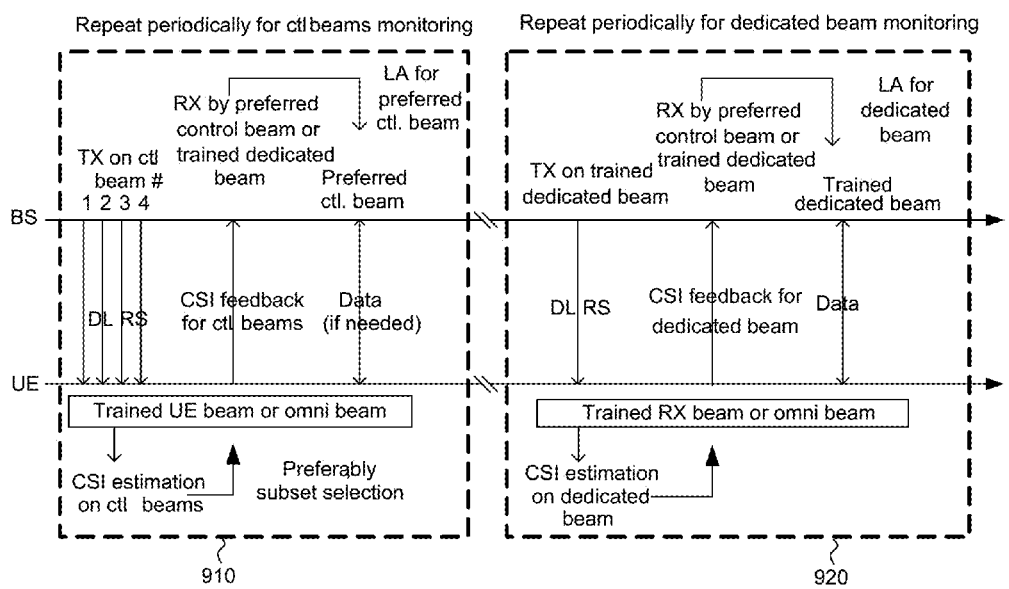
FIG. 9 illustrates signal flow of the second embodiment of DL-RS-based CSI collection.

FIG. 9 illustrates signal flow of the second embodiment of DL-RS-based CSI collection. Box 910 depicts the periodically repeated control beam monitoring. The BS transmits the DL RS via control beams #1, #2, #3, and #4, and the UE receives the DL RS on trained UE beam or omni beam. The UE then performs CSI estimation for each control beam. The UE then feedback the estimated CSI to the BS, which is received by the BS over a preferred control beam or trained dedicated beam. The UE may select a subset of control beams for the CSI feedback to reduce overhead. Based on the estimated channel states, the BS can select the preferred control beam as the fallback beam. Whenever needed, the preferred control beam can also be used for data communication.

Box 920 depicts the periodically repeated dedicated beam monitoring. The BS transmits DL RS on trained dedicated beam. The UE receives the DL RS via trained RX beam or omni beam. The UE then performs CSI estimation on the trained dedicated beam. The UE also feedback the CSI estimation to the BS, which is received by the BS over preferred control beam or by trained dedicated beam. The trained dedicated beam is used for data transmission. If the trained dedicated beam is no longer suitable, then the preferred control beam will be used as a fallback beam to continue data transmission.

The periodicity for control beam monitoring and dedicated beam monitoring is not necessary the same. The CSI feedback for control beams and dedicated beam is preferably combined for UE power efficiency. The preferred control beam and trained dedicated beam are determined in beam administration procedure. The advantage of using DL RS for CSI acquisition is that the same DL RS transmission can be used for all served UEs within beam coverage of the same cell. Multiple CSIs can be aggregated in a single feedback transmission.

In a third embodiment, both UL SRS and DL CSI feedback are used for link monitoring. UE-specific UL wideband SRS transmission is used for UL channel estimation. RS on UL data channel can be used for channel estimation, though more opportunistically and narrowband. If narrowband SRS transmission is used, then multiple transmissions are required to fully cover the desired bandwidth. DL RS transmission is used for DL channel estimation and UL CSI reporting to BS for providing DL channel states. RS in DL data channel can also be used for CSI estimation, though opportunistically.

For fallback possibility, multiple fallback beam channels (e.g., control beam channels) and dedicated beam channels are monitored. This is because the channel characteristics for different beamformers between BS and UE are different. For downlink, each individual DL RS transmissions are required for estimating channel states corresponding to individual beams to be monitored. However, the same DL RS transmission can be used by different UE for CSI estimation. CSI for individual channels can be aggregated and fed back to BS in the same UL transmission periodically. For DL CSI of fallback beams, it is preferred that only a subset of fallback beams' CSI is fed back. For example, the channels with best quality, or the channels whose quality is at least comparable to the associated control beam. For uplink, multiple SRS transmissions per UE are needed. Each individual UE UL SRS transmissions are used for estimating channel states corresponding to individual beams to be monitored. This requires additional complexity in UL scheduling for SRS transmission on the to-be-monitored channels. However, if BS is equipped with multiple RF transceiver chains, then single UE UL SRS transmission can be used for estimating channel states of multiple beams. The main advantage of the third embodiment is that SRS can also be used for UL power control and timing advance in LTE. Further, this embodiment is applicable without reciprocity assumption.

Figure 10:
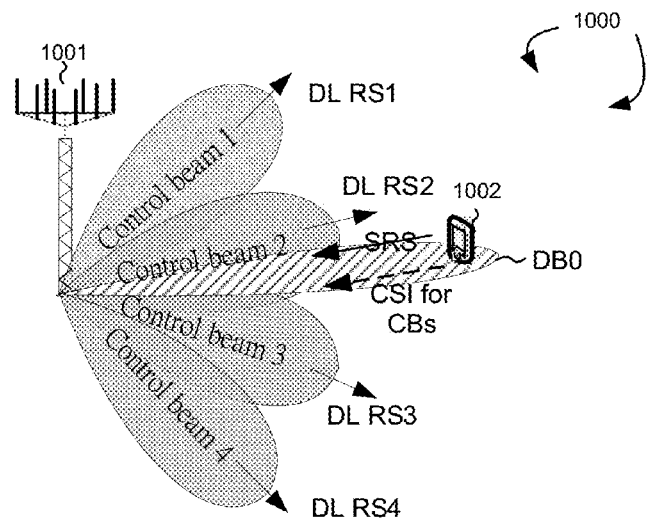
FIG. 10 illustrates a preferred embodiment of a hybrid approach based on CSI feedback and SRS-based CSI collection.

FIG. 10 illustrates a preferred embodiment of a hybrid approach based on CSI feedback and SRS-based CSI collection in a beamforming system. Beamforming network 1000 comprises a BS 1001 and a UE 1002. BS 1001 is directionally configured with multiple cells, and each cell is covered by a set of coarse TX/RX control beams. BS 1001 and UE 1002 also communicate with each other via one or more trained dedicated beams. In the embodiment of FIG. 10, UL SRS is used for a subset of all beams to be monitored. CSI feedback is used for the remaining beams to be monitored. A preferred example uses UL SRS for dedicated beam monitoring, and CSI feedback for fallback beams monitoring. In the example of FIG. 10, UE 1002 transmits SRS to BS 1001 over dedicated beam DB0. BS 1001 estimates CSI for DB0. BS 1001 transmits DL RS1 over control beam 1 (CB1) to UE 1002, transmits DL RS2 over control beam 2 (CB2) to UE 1002, transmits DL RS3 over control beam 3 (CB3) to UE 1002, and transmits DL RS4 over control beam 4 (CB4) to UE 1002. UE 1002 estimates CSIs and provides CSI feedback for CBs.

SRS transmission for dedicated data beam monitoring is beneficial for throughput. Better beamformer estimation by BS is possible to achieve optimized beamformer. This is because BS is required to be equipped with multiple transceiver chains for better beamformer estimation, and the estimated beamformer may not be constrained by a codebook known to UE. This is especially true in DL MU-MIMO scenario, which is a sensible high-rank transmission method in mmWave system. Furthermore, minimized extra power consumption can be achieved since UL SRS is only for dedicated data beam monitoring.

Basic transmission mode is applied for CSI feedback. The throughput loss due to CSI quantization is insignificant for basic transmission mode. For transmission with beams whose resolution is similar to control beams, it is less likely that MU-MIMO is used. Therefore, it is more sensible to use a baseline transmission mode without MU-MIMO for fallback. CSI feedback for individual channels can be aggregated in the same UL transmission.

Figure 11:
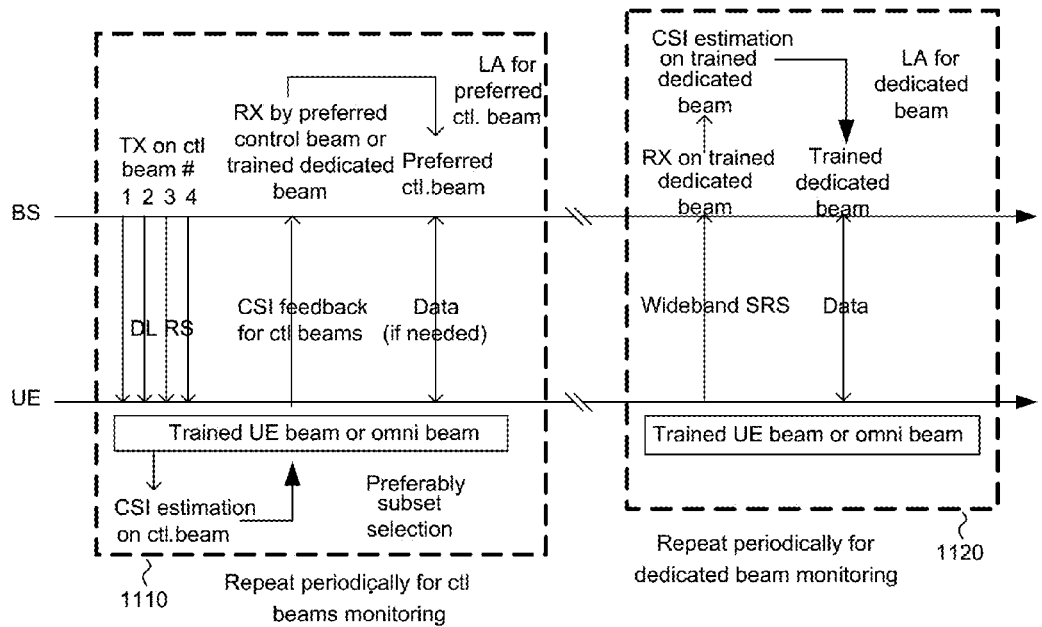
FIG. 11 illustrates signal flow of the preferred embodiment of the hybrid approach based on CSI feedback and SRS-based CSI acquisition.

FIG. 11 illustrates signal flow of the preferred embodiment of the hybrid approach based on CSI feedback and SRS-based CSI acquisition. Box 1110 depicts the periodically repeated control beam monitoring. The BS transmits the DL RS via control beams #1, #2, #3, and #4, and the UE receives the DL RS on trained UE beam or omni beam. The UE then performs CSI estimation for each control beam. The UE then feedback the estimated CSI to the BS, which is received by the BS over a preferred control beam or trained dedicated beam. The UE may select a subset of control beams for the CSI feedback to reduce overhead. For example, the channels with best quality, or the channels whose quality is at least comparable to the associated control beam. Based on the estimated channel states, the BS can select the preferred control beam as the fallback beam. Whenever needed, the preferred control beam can also be used for data communication.

Box 1120 depicts the periodically repeated dedicated beam monitoring. The UE transmits wideband SRS by using trained UE beam or omni beam. The BS receives the SRS via trained dedicated beam. The BS then performs CSI estimation on the trained dedicated beam. The trained dedicated beam is used for data transmission. If the trained dedicated beam is no longer suitable, then the preferred control beam will be used as a fallback beam to continue data transmission.

The periodicity for control beam monitoring and dedicated beam monitoring is not necessary the same. The CSI feedback for control beams and dedicated beam is preferably combined for UE power efficiency. The preferred control beam and trained dedicated beam are determined in beam administration procedure. The advantage of the hybrid approach is throughput improvement, because channel states can be directly estimated at BS by UL SRS transmission, thus no need for CSI quantization for feedback. Better beamformer estimation by BS is possible to achieve optimized beamformer. This is because BS is required to be equipped with multiple transceiver chains for better beamformer estimation, and the estimated beamformer may not be constrained by a codebook known to UE. This is especially true in DL MU-MIMO scenario, which is a sensible high-rank transmission method in mmWave system. Furthermore, the same UL SRS can also be used by the UE for UL power control and timing advance if needed. Extra power consumption for UL SRS transmission is minimized by selecting a small subset for UL SRS transmission. Other channel states are monitored via DL CSI estimation and feedback. Multiple CSIs can be aggregated in a single feedback transmission for UE power efficiency. The same DL RS transmission can be used for all served UEs within beam coverage of the same cell.

Figure 12:
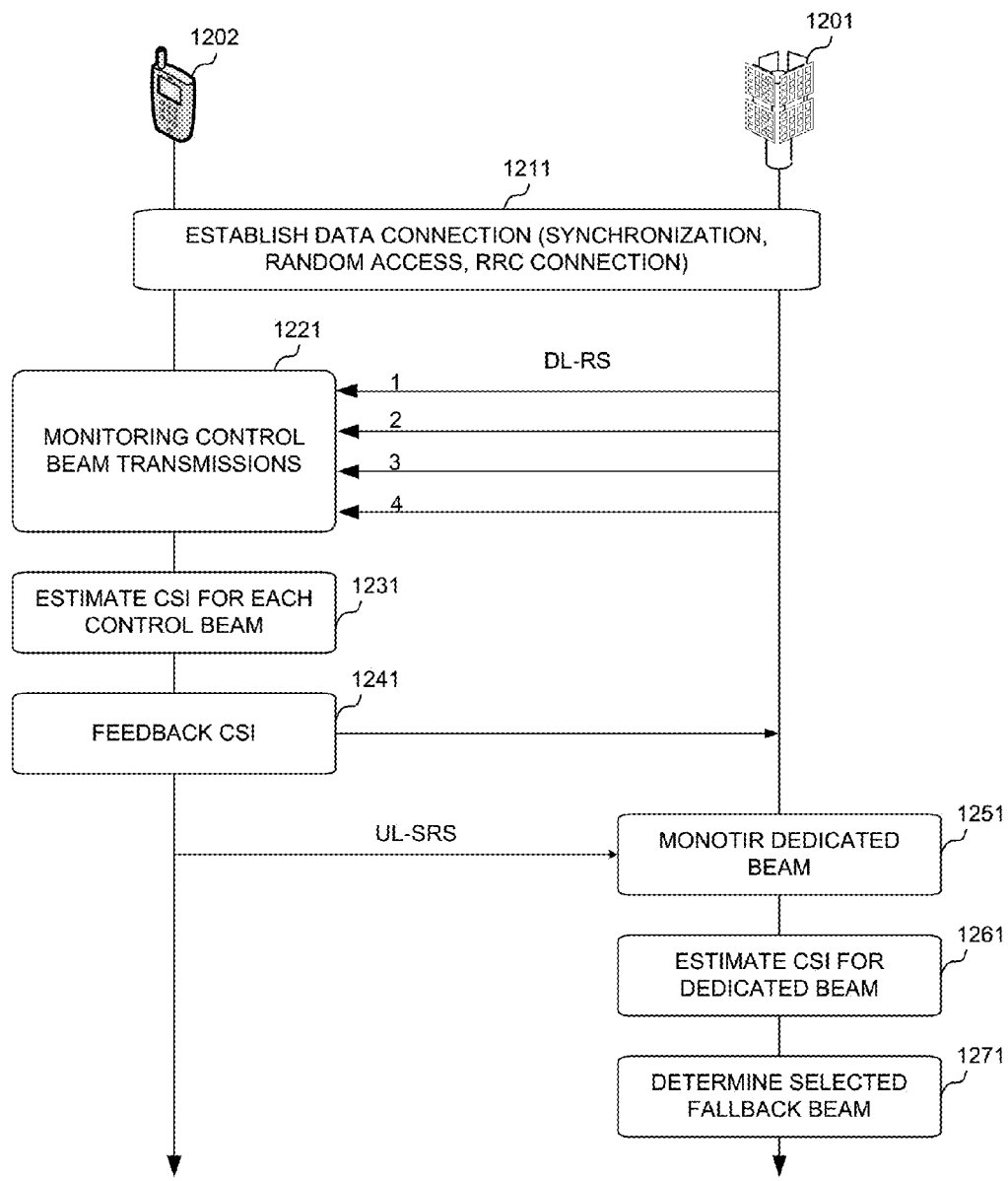
FIG. 12 illustrates a procedure of the preferred embodiment for CSI collection.

FIG. 12 illustrates a procedure of the preferred embodiment for CSI collection in a beamforming system. In step 1211, BS 1201 and UE 1202 established a data connection over a trained dedicated data beam selected by a beam administration procedure (after performing synchronization, random access, and RRC connection establishment). Note that a beam administration procedure decides proper BS beam and UE beam for communication. Beam administration is an ongoing process, starting when a connection is attempted to be established between BS and UE. Within certain mobility and environmental change limit, beam administration can run proper and provides pairs of BS beams and UE beams for communication. In extreme cases where, for example, dedicated beams provided by beam administration fails to work—selected fallback beam can then be applied.

In step 1221, BS 1201 transmits DL RS over the control beams for fallback beam selection. UE 1202 monitors the control beam transmission. In step 1231, UE 1202 estimates CSI for the control beam channels. In step 1241, UE selects a subset of CSIs to be feedback to BS 1201. In step 1251, UE 1202 transmits UL SRS over the dedicated data beam. BS 1201 monitors the dedicated beam transmission. In step 1261, BS 1201 estimates the CSI for the dedicated beam channel. In step 1271, BS 1201 determines a preferred control beam for fallback beam. The CSI mechanism here wants to make sure that, in fallback case, proper CSI is ready for, e.g., link adaptation and scheduling. Note that in case the current beam is not a dedicated beam, but is a beam of the same resolution as the control beam, the above method is still applicable except that dedicated beam monitoring is not required. Further, the selected fallback beam is applicable to both UL and DL directions if reciprocity is used.

Figure 13:
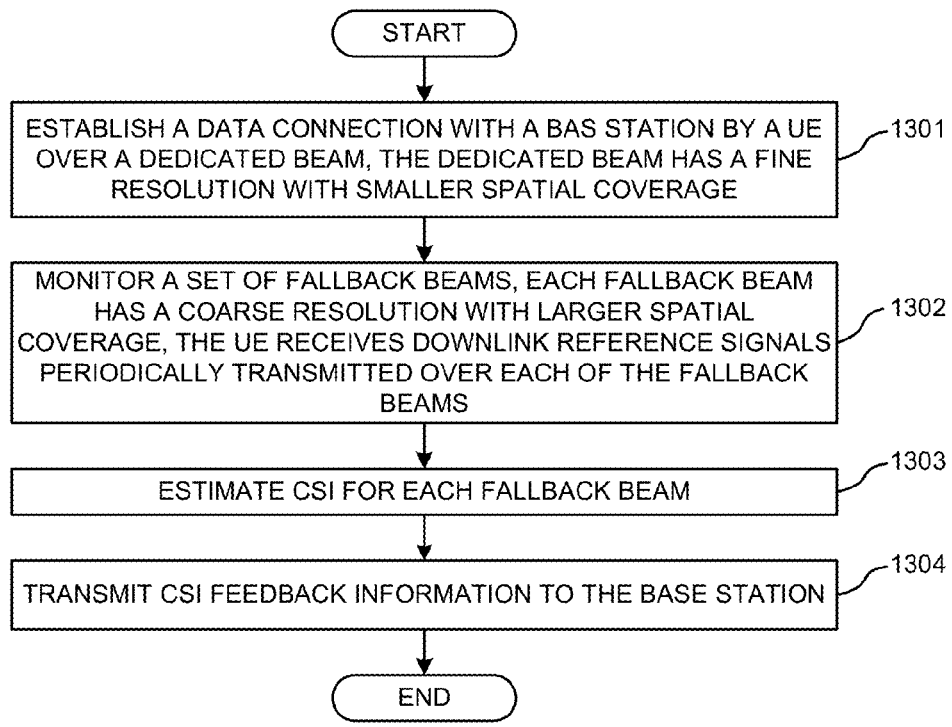
FIG. 13 is a flow chart of a method of CSI collection from UE perspective in a beamforming system in accordance with one novel aspect.

FIG. 13 is a flow chart of a method of CSI collection from UE perspective in a beamforming system in accordance with one novel aspect. In step 1301, a UE establishes a data connection with a base station over a dedicated beam in a beamforming network. The dedicated beam has a fine resolution with smaller spatial coverage. In step 1302, the UE monitors a set of fallback beams. Each fallback beam has a coarse resolution with larger spatial coverage. The UE receives DL-RS periodically transmitted over each of the fallback beams. In step 1303, the UE estimates CSI for each fallback beam. In step 1304, the UE transmits CSI feedback information to the base station. In one embodiment, the fallback beams are control beams, and a collection of the control beams covers an entire service area of a cell of the base station. The UE switches to a selected fallback beam for data communication when a channel quality associated with the dedicated beam is below a threshold.

Figure 14:
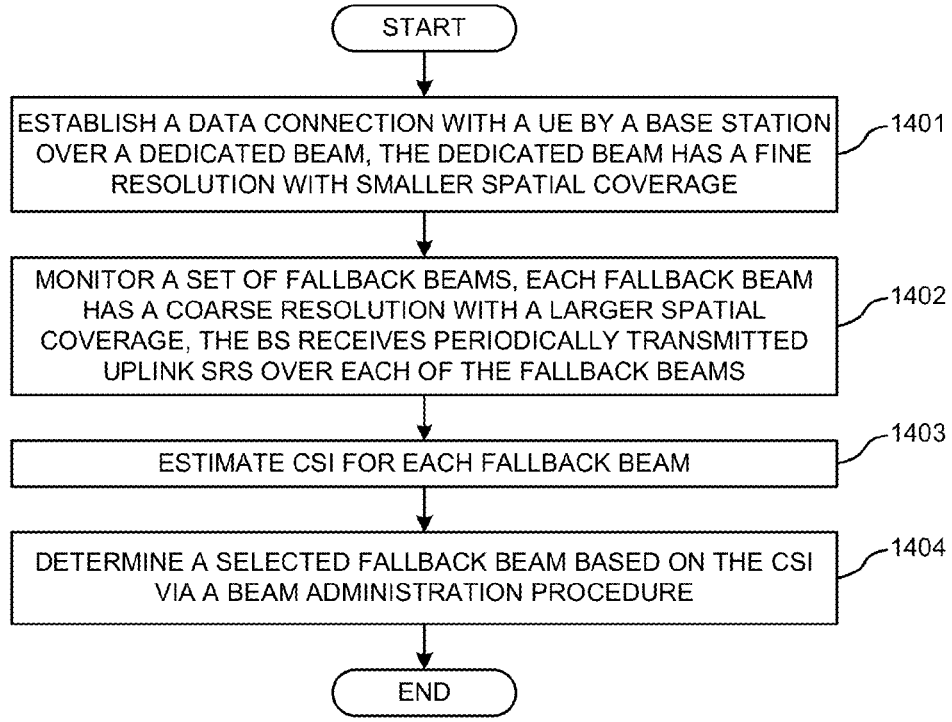
FIG. 14 is a flow chart of a method of CSI collection from BS perspective in a beamforming system in accordance with one novel aspect.

FIG. 14 is a flow chart of a method of CSI collection from BS perspective in a beamforming system in accordance with one novel aspect. In step 1401, a base station establishes a data connection with a UE over a dedicated beam in a beamforming network. The dedicated beam has a fine resolution with a smaller spatial coverage. In step 1402, the base station monitors a set of fallback beams. Each fallback beam has a coarse resolution with a larger spatial coverage. The base station receives periodically transmitted UL SRS over each of the fallback beams. In step 1403, the base station estimates the CSI for each fallback beam. In step 1404, the base station determines a selected fallback beam. In one embodiment, the fallback beams are control beams, and a collection of the control beams covers an entire service area of a cell. The UE switches to a selected fallback beam for data communication when a channel quality associated with the dedicated beam is below a threshold.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
   establishing a data connection with a base station by a user equipment (UE) over a dedicated beam, wherein the dedicated beam has a fine resolution with narrower angular coverage and longer-by-narrower spatial coverage;
   monitoring a set of fallback beams, wherein each fallback beam has a coarse resolution with wider angular coverage and shorter-by-wider spatial coverage, wherein the shorter-by-wider spatial coverage of each fallback beam is larger than the longer-by-narrower spatial coverage of the dedicated beam, and wherein the UE receives downlink reference signals (DL-RSs) periodically transmitted over each of the fallback beams;
   estimating channel state information (CSI) for each fallback beam;
   transmitting CSI feedback information to the base station; and
   switching the data connection from the dedicated beam to a selected fallback beam when a channel quality associated with the dedicated beam falls below a threshold.

2. The method of claim 1, wherein the fallback beams are control beams, and wherein a collection of the control beams has a spatial coverage that covers an entire service area of a cell.

3. The method of claim 1, wherein the UE switches the data connection from the dedicated beam to the selected fallback beam.

4. The method of claim 1, further comprising:
   monitoring the dedicated beam, wherein the UE receives DL-RSs periodically transmitted via the dedicated beam.

5. The method of claim 4, wherein the DL-RSs via the fallback beams are transmitted with a first periodicity, and wherein the DL-RSs via the dedicated beam are transmitted with a second periodicity.

6. The method of claim 1, wherein the CSI feedback information comprises the estimated CSI of a subset of the set of fallback beams.

7. The method of claim 1, further comprising:
   periodically transmitting uplink sounding reference signals (UL SRSs) to the base station via the dedicated beam for CSI estimation.

8. The method of claim 7, wherein the UL SRSs are wideband radio signals transmitted with UE-side beamforming.

9. A user equipment (UE), comprising:
   a radio frequency (RF) transceiver that transmits and receives radio signals to/from a base station in a beamforming network, wherein the UE establishes a data connection with the base station via a dedicated beam, and wherein the dedicated beam has a fine resolution with narrower angular coverage and longer-by-narrower spatial coverage; and
   a channel state information (CSI) collector that monitors a set of fallback beams, wherein each fallback beam has a coarse resolution with wider angular coverage and shorter-by-wider spatial coverage, wherein the shorter-by-wider spatial coverage of each fallback beam is larger than the longer-by-narrower spatial coverage of the dedicated beam, wherein the UE receives downlink reference signals (DL-RSs) periodically transmitted via each of the fallback beams, wherein the UE estimates CSI for each fallback beam, wherein the UE transmits CSI feedback information to the base station, and wherein the data connection is switched from the dedicated beam to a selected fallback beam when a channel quality associated with the dedicated beam falls below a threshold.

10. The UE of claim 9, wherein the fallback beams are control beams, and wherein a collection of the control beams has a spatial coverage that covers an entire service area of a cell.

11. The UE of claim 9, wherein the channel quality is estimated based on CQI.

12. The UE of claim 9, wherein the CSI collector comprises a beam monitor that monitors the dedicated beam, and wherein the UE receives DL-RSs periodically transmitted via the dedicated beam.

13. The UE of claim 12, wherein the DL-RSs via the fallback beams are transmitted with a first periodicity, and wherein the DL-RSs via the dedicated beam are transmitted with a second periodicity.

14. The UE of claim 9, wherein the CSI feedback information comprises the estimated CSI of a subset of the set of fallback beams.

15. The UE of claim 9, wherein the UE periodically transmits uplink sounding reference signals (UL SRSs) to the base station via the dedicated beam for CSI estimation.

16. The UE of claim 15, wherein the UL SRSs are wideband radio signals transmitted with UE-side beamforming.

\* \* \* \* \*